US011417316B2

(12) United States Patent
Huang et al.

(10) Patent No.: US 11,417,316 B2
(45) Date of Patent: Aug. 16, 2022

(54) SPEECH SYNTHESIS METHOD AND APPARATUS AND COMPUTER READABLE STORAGE MEDIUM USING THE SAME

(71) Applicant: UBTECH ROBOTICS CORP LTD, Shenzhen (CN)

(72) Inventors: Dongyan Huang, Shenzhen (CN); Leyuan Sheng, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 8 days.

(21) Appl. No.: 17/115,729

(22) Filed: Dec. 8, 2020

(65) Prior Publication Data

US 2021/0193113 A1    Jun. 24, 2021

Related U.S. Application Data

(63) Continuation of application No. PCT/CN2019/127327, filed on Dec. 23, 2019.

(51) Int. Cl.
*G10L 13/08* (2013.01)
*G10L 13/047* (2013.01)
*G10L 25/24* (2013.01)

(52) U.S. Cl.
CPC ............ *G10L 13/08* (2013.01); *G10L 13/047* (2013.01); *G10L 25/24* (2013.01)

(58) Field of Classification Search
CPC ...... G10L 13/00; G10L 2013/00; G10L 25/00
See application file for complete search history.

(56) References Cited

FOREIGN PATENT DOCUMENTS

| CN | 109523989 A | 3/2019 | |
|---|---|---|---|
| WO | WO-2019139430 A1 * | 7/2019 | ............... G06N 3/04 |
| WO | WO-2021118604 A1 * | 6/2021 | ........... G06N 3/0445 |

OTHER PUBLICATIONS

Sheng, Leyuan & Huang, Dong-Yan & Pavlovskiy, Evgeniy. (2019). High-quality Speech Synthesis Using Super-resolution Mel-Spectrogram. (Year: 2019).*

(Continued)

*Primary Examiner* — Pierre Louis Desir
*Assistant Examiner* — Neel Piyushkumar Karelia (57) ABSTRACT

The present disclosure provides a speech synthesis method as well as an apparatus and a computer readable storage medium using the same. The method includes: obtaining a to-be-synthesized text, and extracting to-be-processed Mel spectrum features of the to-be-synthesized text through a preset speech feature extraction algorithm; inputting the to-be-processed Mel spectrum features into a preset ResUnet network model to obtain first intermediate features; performing an average pooling and a first down sampling on the to-be-processed Mel spectrum features to obtain second intermediate features; taking the second intermediate features and the first intermediate features output by the ResUnet network model as an input to perform a deconvolution and a first up sampling so as to obtain target Mel spectrum features corresponding to the to-be-processed Mel spectrum features; and converting the target Mel spectrum features into a target speech corresponding to the to-be-synthesized text.

20 Claims, 11 Drawing Sheets

(56) References Cited

OTHER PUBLICATIONS

Volodymyr Kuleshov, S. Zayd Enam, Stefano Ermon, Audio Super Resolution using Neural Networks (2017), 5th International Conference on Learning Representations (ICLR) 2017 (Year: 2017).*

T. Kaneko and H. Kameoka, "CycleGAN-VC: Non-parallel Voice Conversion Using Cycle-Consistent Adversarial Networks," 2018 26th European Signal Processing Conference (EUSIPCO), 2018, pp. 2100-2104, doi: 10.23919/EUSIPCO.2018.8553236. (Year: 2018).*

O. Ernst, S. E. Chazan, S. Gannot and J. Goldberger, "Speech Dereverberation Using Fully Convolutional Networks," 2018 26th European Signal Processing Conference (EUSIPCO), 2018, pp. 390-394, doi: 10.23919/EUSIPCO.2018.8553141. (Year: 2018).*

\* cited by examiner

SPEECH SYNTHESIS METHOD AND APPARATUS AND COMPUTER READABLE STORAGE MEDIUM USING THE SAME

CROSS REFERENCE TO RELATED APPLICATIONS

The present disclosure is a continuation-application of International Application PCT/CN2019/127327, with an international filing date of Dec. 23, 2019, the contents of all of which are hereby incorporated by reference.

BACKGROUND

1. Technical Field

The present disclosure relates to artificial intelligence technology, and particularly to a speech synthesis method as well as an apparatus and a computer readable storage medium using the same.

2. Description of Related Art

With the rapid development of mobile Internet and artificial intelligence technologies, there emerges various speech synthesis application scenarios such as voice broadcasting, voice novels, voice news, and intelligent voice interaction. In which, speech synthesis can convert texts, words, and the like into and output as natural speeches.

Generally speaking, a speech synthesis system includes a text analysis stage and a speech synthesis stage. The text analysis stage and the speech synthesis stage can be integrated into an end-to-end model through deep learning. In which, the end-to-end model is mainly realized by two steps. The first step is to map a text to speech features, and the second step is to convert the speech features into a synthesized speech. In various speech synthesis and speech feature extraction methods, the Mel spectrum features can be used as intermediate feature variables for the conversion between text and speech, which can be used to better synthesize text to speech.

However, in the existing technical solutions, compared with the Mel spectrum features of real speech, the Mel spectrum features obtained by analyzing and extracting text lack a lot of rich information, and there is a certain difference with respect to the real Mel spectrum features. Therefore, the pronunciations of the speeches synthesized according to the Mel spectrum features are not natural enough.

That is to say, in the above-mentioned existing speech synthesis solution, the accuracy of the synthesized speech is insufficient because of its difference with respect to the Mel spectrum features of real speech.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
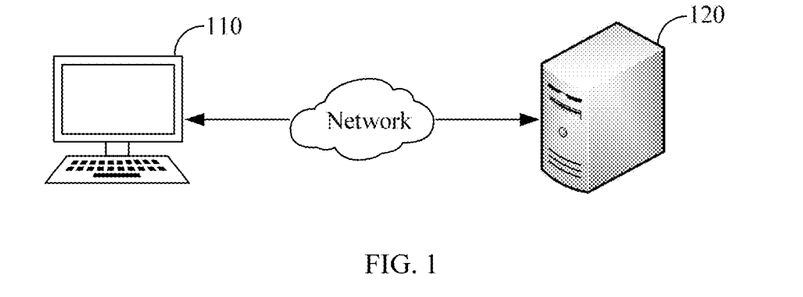
FIG. 1 is a schematic diagram of a scenario of using speech synthesis method according to an embodiment of the present disclosure.
Figure 10:
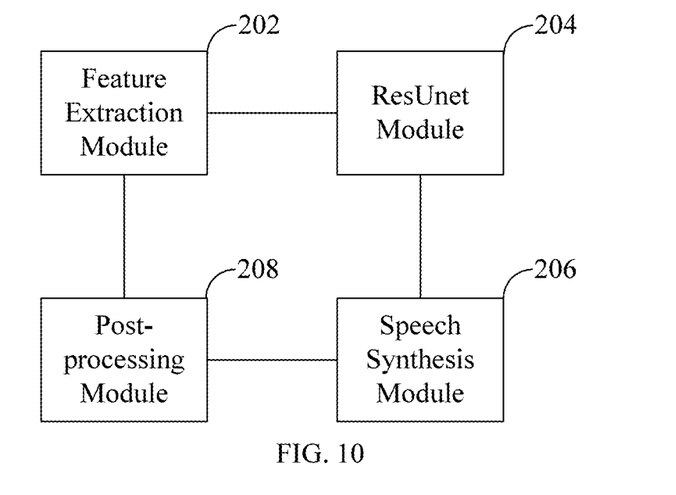
FIG. 10 is a schematic block diagram of a speech synthesis apparatus according to an embodiment of the present disclosure.
Figure 11:
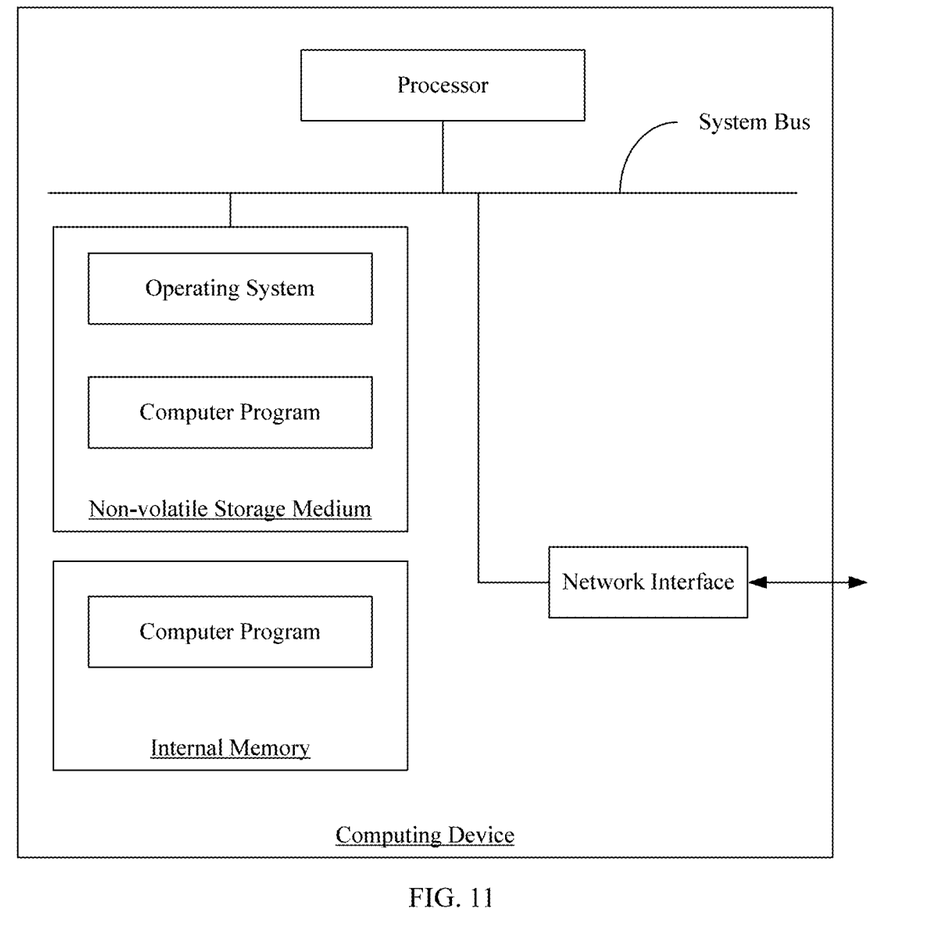
FIG. 11 is a schematic block diagram of a computing device executing a speech synthesis method according to an embodiment of the present disclosure.

FIG. 1 is a schematic diagram of a scenario of using speech synthesis method according to an embodiment of the present disclosure. As shown in FIG. 1, a speech synthesis system may include a terminal device 110 and a server 120. The terminal device 110 and the server 120 are connected through a network. The terminal device 110 can be a desktop terminal or a mobile terminal, and the mobile terminal can be a robot, a mobile phone, a tablet computer, a notebook computer, or other electronic device (e.g., a speech synthesis apparatus as shown in FIG. 10 and a computing device as shown in FIG. 11). The server 120 can be an electronic device such as the speech synthesis apparatus of FIG. 10 or the computing device of FIG. 11, which can be implemented as an independent server or a server cluster composed of a plurality of servers. In which, the terminal device 110 is configured to analyze and process to-be-synthesized texts, and the server 120 is configured to perform the training and prediction of models.

In another embodiment, another speech synthesis system can only include a terminal device such as the speech synthesis apparatus of FIG. 10 or the computing device of FIG. 11. The terminal device is configured to perform the training and prediction of models, and convert to-be-synthesized texts into speeches.

Figure 2:
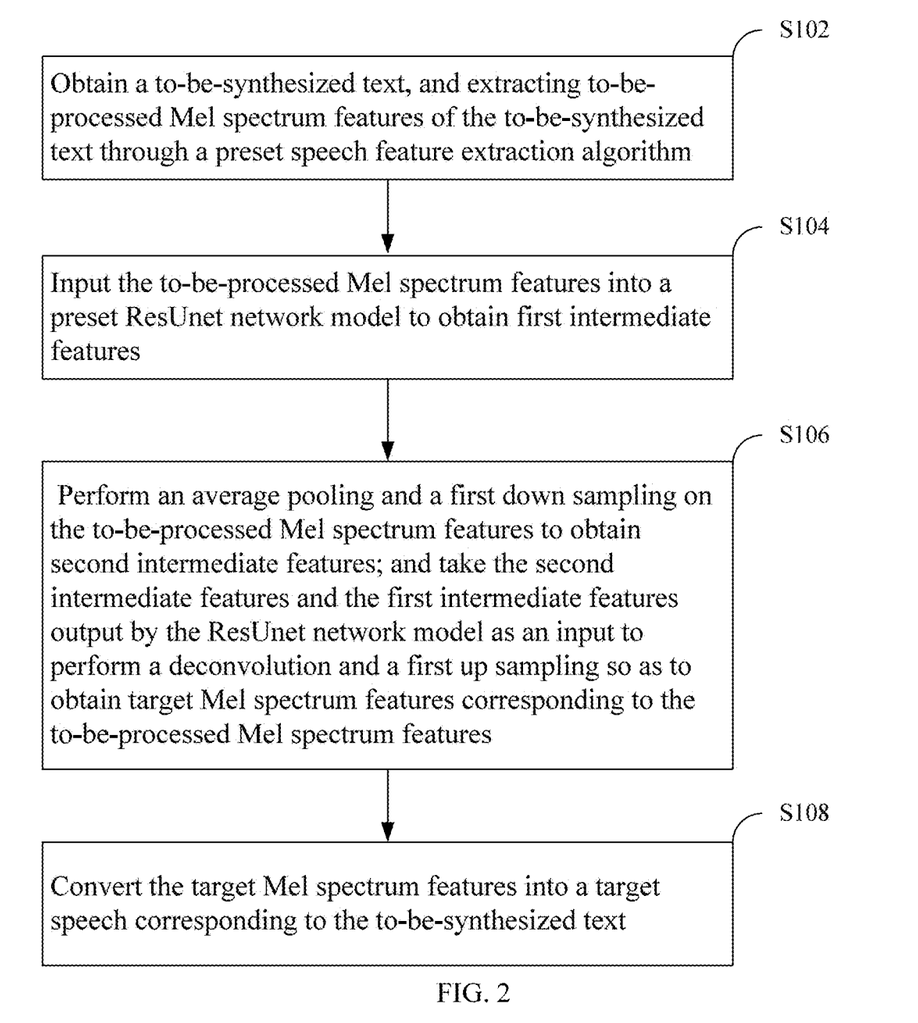
FIG. 2 is a flow chart of a speech synthesis method according to the embodiment of FIG. 1.

FIG. 2 is a flow chart of a speech synthesis method according to the embodiment of FIG. 1. In this embodiment, a speech synthesis method is provided. The method is a computer-implemented method executable for a processor, which is implemented through the terminal device 110 of the speech synthesis system of FIG. 1. In other embodiments, the method can be implemented through the server 120 of FIG. 1, or be implemented through other electronic device (e.g., the speech synthesis apparatus of FIG. 10 and the computing device of FIG. 11). The method includes the following steps.

S102: obtaining a to-be-synthesized text, and extracting to-be-processed Mel spectrum features of the to-be-synthesized text through a preset speech feature extraction algorithm.

The to-be-synthesized text is a text that requires speech synthesis. For example, the text for a scenario such as robot chatting and newspaper reading that needs to be converted into speeches.

As an example, the to-be-synthesized text can be "Since that moment, she will no longer be belittle herself."

The to-be-synthesized text is analyzed, and the corresponding Mel spectrum features are extracted through the preset speech feature extraction algorithm as the to-be-processed Mel spectrum features. In which, the Mel bank features can be used to identify the voice features of sounds or sentences. In this embodiment, the Mel spectrum features are used as intermediate features between text and speech.

Figure 3:
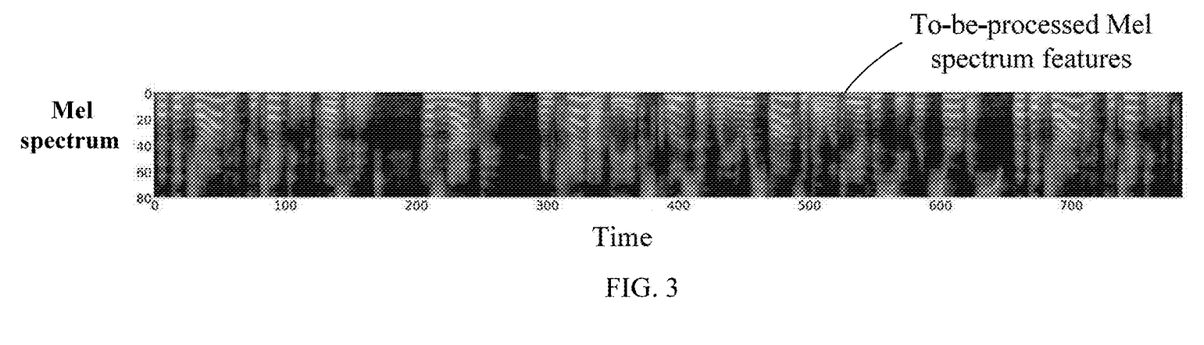
FIG. 3 is a schematic diagram of a Mel spectrum feature according to the embodiment of FIG. 1.

FIG. 3 is a schematic diagram of a Mel spectrum feature according to the embodiment of FIG. 1. As shown in FIG. 3, in this embodiment, an example of extracted Mel spectrum features is given.

S104: inputting the to-be-processed Mel spectrum features into a preset ResUnet network model to obtain first intermediate features.

The ResUnet network model can perform down sampling, residual connection, and up sampling on the to-be-processed Mel spectrum features to obtain the first intermediate features corresponding to the to-be-processed Mel spectrum features, where the first intermediate features are for the subsequent calculations.

In this embodiment, a second down sampling, a residual connection processing, and a second up sampling are performed on the to-be-processed Mel spectrum features through the ResUnet network model to obtain the first intermediate features. A second down sampling is performed on the to-be-processed Mel spectrum features through the ResUnet network model first, then the residual connection processing is performed on the features after the down sampling, and then the second up sampling is performed thereon. In this process, among the other features corresponding to the to-be-processed Mel spectrum features, the number of data channels is changed in the sequence of small, large, and small, and the data dimension is changed in the sequence of large, small, and large. As the number of data channels grows from small to large, the abstract semantic information contained in the features gradually increases, and as the size of the data channels changes from large to small, the features not only contain rich semantic information, but also contain enough spatial detail information with the help of up sampling and data additions, so that the features can be restored to the same resolution as the inputted to-be-processed Mel spectrum features.

Figure 4:
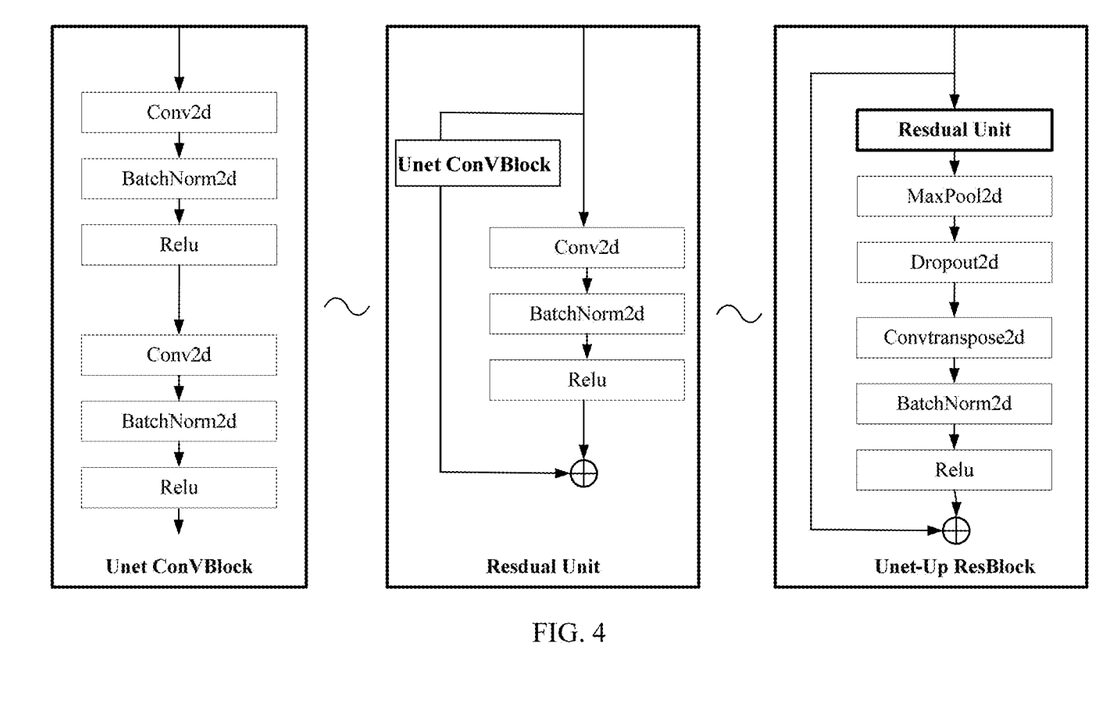
FIG. 4 is a schematic diagram of the structure of a ResUnet network model according to the embodiment of FIG. 1.

FIG. 4 is a schematic diagram of the structure of a ResUnet network model according to the embodiment of FIG. 1. As shown in FIG. 4, a ResUnet network model includes an up sampling module Unet-UpResBlock, a residual connection module ResidualUnit, and a down sampling module Unet ConVBlock.

The down sampling module Unet ConVBlock contains two groups of (Conv2d, BatchNorm2d, Relu) structures, where Conv2d represents a two-dimensional convolutional layer, BatchNorm2d represents a two-dimensional batch normalization, and Relu represents a rectified linear unit.

The residual connection module ResidualUnit includes the down sampling module Unet ConVBlock on the left and one group of (Conv2d, BatchNorm2d, Relu) structure on the right. The input of the residual connection module ResidualUnit is processed by the down sampling module Unet ConVBlock and (Conv2d, BatchNorm2d, Relu) structure, and then a jump addition is performed on the obtained result, which realizes jump connection and makes up for the information lost in the process of the down sampling.

The up sampling module Unet-UpResBlock contains two branches on the left and the right. The branch on the left does not process the input, while in the branch on the right, Residual Unit represents the residual connection module ResidualUnit, and then after the processing of MaxPool2d, Dropout2d, ConvTranspose2d, BatchNorm2d, and Relu, the input is jump-added with the left branch. In which, MaxPool2d represents a two-dimensional maximum pooling layer, Dropout2d represents a two-dimensional discarding layer, ConvTranspose2d represents a two-dimensional deconvolution layer, BatchNorm2d represents a two-dimensional batch normalization, and Relu represents a rectified linear unit.

Figure 5:
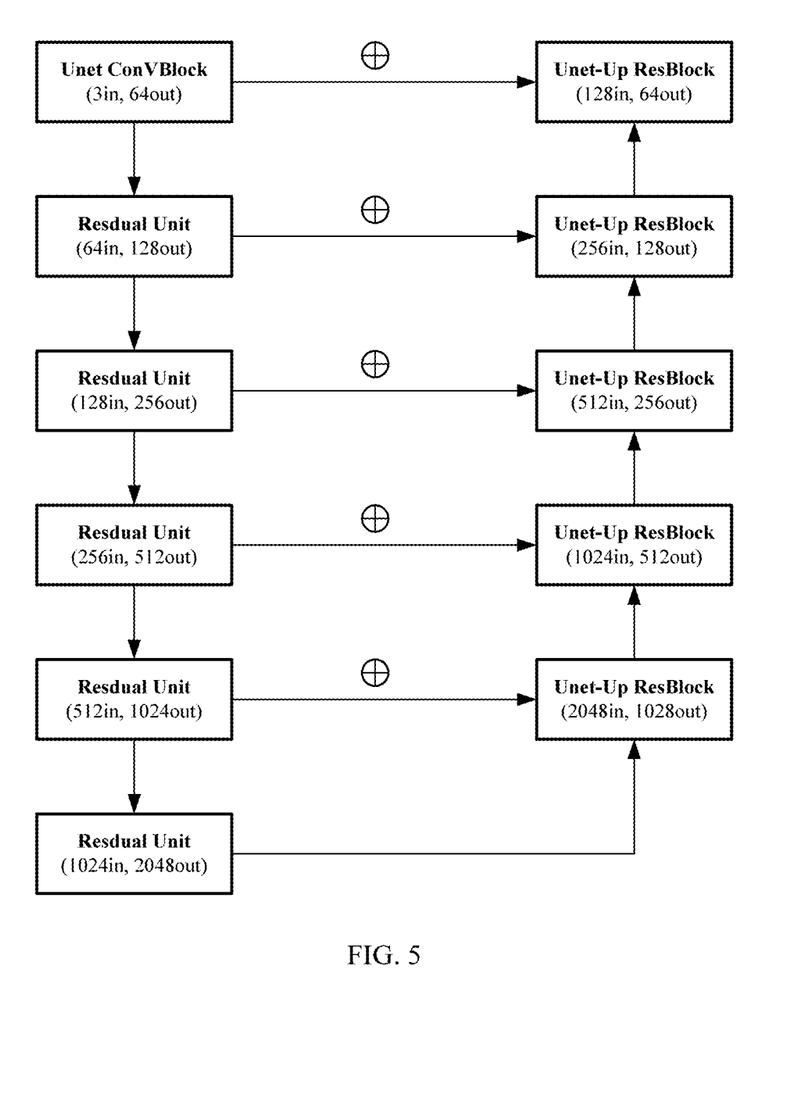
FIG. 5 is a schematic diagram of the structure of a ResUnet network model according to another embodiment of the present disclosure.

FIG. 5 is a schematic diagram of the structure of a ResUnet network model according to another embodiment of the present disclosure. Referring to FIG. 5, another example of the ResUnet network model is shown. As shown in FIG. 5, the to-be-processed Mel spectrum features are inputted into the down sampling module UnetConvBlovk of the ResUnet network model, and then passes through 5 residual connection modules ResidualUnit, and finally passes through 5 up sampling modules Unet-UpResBlock. In addition, the result after the up sampling module Unet-UpResBlock is jump-added with the output result of the corresponding residual connection module ResidualUnit or down sampling module UnetConvBlovk on the left.

As shown in FIG. 5, in this embodiment, the Mel spectrum features that are inputted into the down sampling module UnetConvBlovk have 3 data channels, and the output have 64 data channels. After passing through the residual connection module ResidualUnit, the data channels of the features are increased from 64 to 128, 256, 512, 1024, and 2048. After passing through the up sampling module Unet-UpResBlock, the data channels of the features are reduced from 2048 to 1024, 512, 256, 128, and 64. That is, the final outputted features have 64 data channels.

As shown in FIG. 5, during passing through the down sampling module Unet ConVBlock and the residual connection module ResidualUnit on the left, the size of the features changes from large to small while the number of channels changes from less to more and can obtain more global semantic information. In which, through the continuous down sampling and residual connection in the down sampling module Unet ConVBlock and the residual connection module ResidualUnit, it makes the number of channels more and more while the size of the features getting smaller and smaller, that is, the resolution is reduced. In this process, the features become more efficient and abstract while lose more spatial details.

During passing through the up sampling module Unet-UpResBlock on the right, the size of the features is changed from small to large by up sampling, and the number of channels is reduced by deconvolution. In addition, after each up sampling, there will be one jump-addition with the features obtained by the down sampling module Unet ConV-Block and the residual connection module ResidualUnit. After the above-mentioned process, the features have high resolution while there still has abstract low-resolution features. That is, the final generated features include features of different sizes, and sufficient spatial detail information is retained to make the prediction result more accurate.

It should be noted that, in this embodiment, in the ResUnet network model, the numbers of the residual connection modules ResidualUnit and the up sampling modules Unet-UpResBlock are the same. In other words, the ResUnet network model includes a down sampling module Unet ConVBlock, at least one residual connection module ResidualUnit, and at least one up sampling module Unet-UpResBlock, while the number of residual connection modules ResidualUnit is the same as the number of up sampling modules Unet-UpResBlock.

Figure 6:
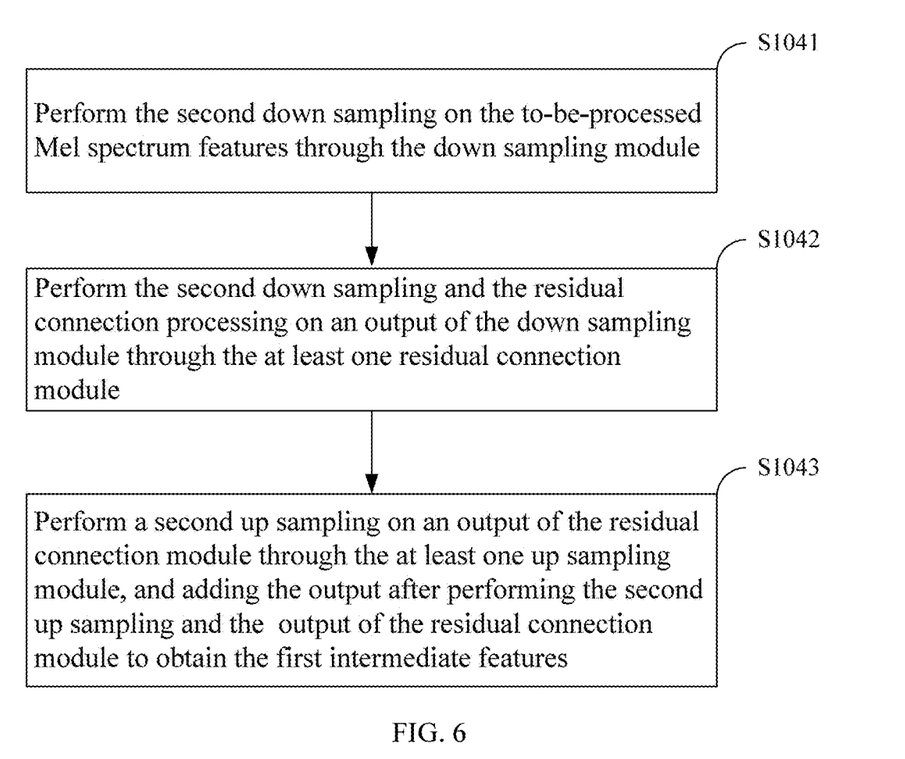
FIG. 6 is a flow chart of data processing by a ResUnet network model according to the embodiment of FIG. 1.

FIG. 6 is a flow chart of data processing by a ResUnet network model according to the embodiment of FIG. 1. In this embodiment, as shown in FIG. 6, the above-mentioned step S104 of inputting the to-be-processed Mel spectrum features into the preset ResUnet network model to obtain the first intermediate features includes steps of:

S1041: performing the second down sampling on the to-be-processed Mel spectrum features through the down sampling module;

S1042: performing the second down sampling and the residual connection processing on an output of the down sampling module through the at least one residual connection module; and S1043: performing a second up sampling on an output of the residual connection module through the at least one up sampling module, and adding the output after performing the second up sampling and the output of the residual connection module to obtain the first intermediate features.

The to-be-processed Mel spectrum features are inputted into the down sampling module of the ResUnet network model to perform the second down sampling, then perform the second down sampling and residual connection processing through at least one residual connection module, and finally perform the second up sampling through the at least one up sampling module. In addition, the result after each passing through the up sampling module will be jump-added with the output of the residual connection module or the down sampling module to obtain the final first intermediate features.

S106: performing an average pooling and a first down sampling on the to-be-processed Mel spectrum features to obtain second intermediate features; and taking the second intermediate features and the first intermediate features output by the ResUnet network model as an input to perform a deconvolution and a first up sampling so as to obtain target Mel spectrum features corresponding to the to-be-processed Mel spectrum features.

In this embodiment, in order to improve the quality of the Mel spectrum features and supplement the missing information, the bottom-up average pooling and down sampling are performed on the to-be-processed Mel spectrum features extracted from the to-be-synthesized text to obtain the second intermediate features.

Then, the first intermediate features outputted by the ResUnet network model and the second intermediate features after the average pooling and down sampling are jump-added, and then the deconvolution and the first up sampling are performed thereon. In addition, after each up sampling, the result is jump-added with the result after the corresponding first down sampling so as to obtain the final target Mel spectrum features.

As an example, the first down sampling is performed at least once, the corresponding second up sampling is also performed at least once, and the number of the first down sampling processes is the same as the number of the second up sampling processes.

Figure 7:
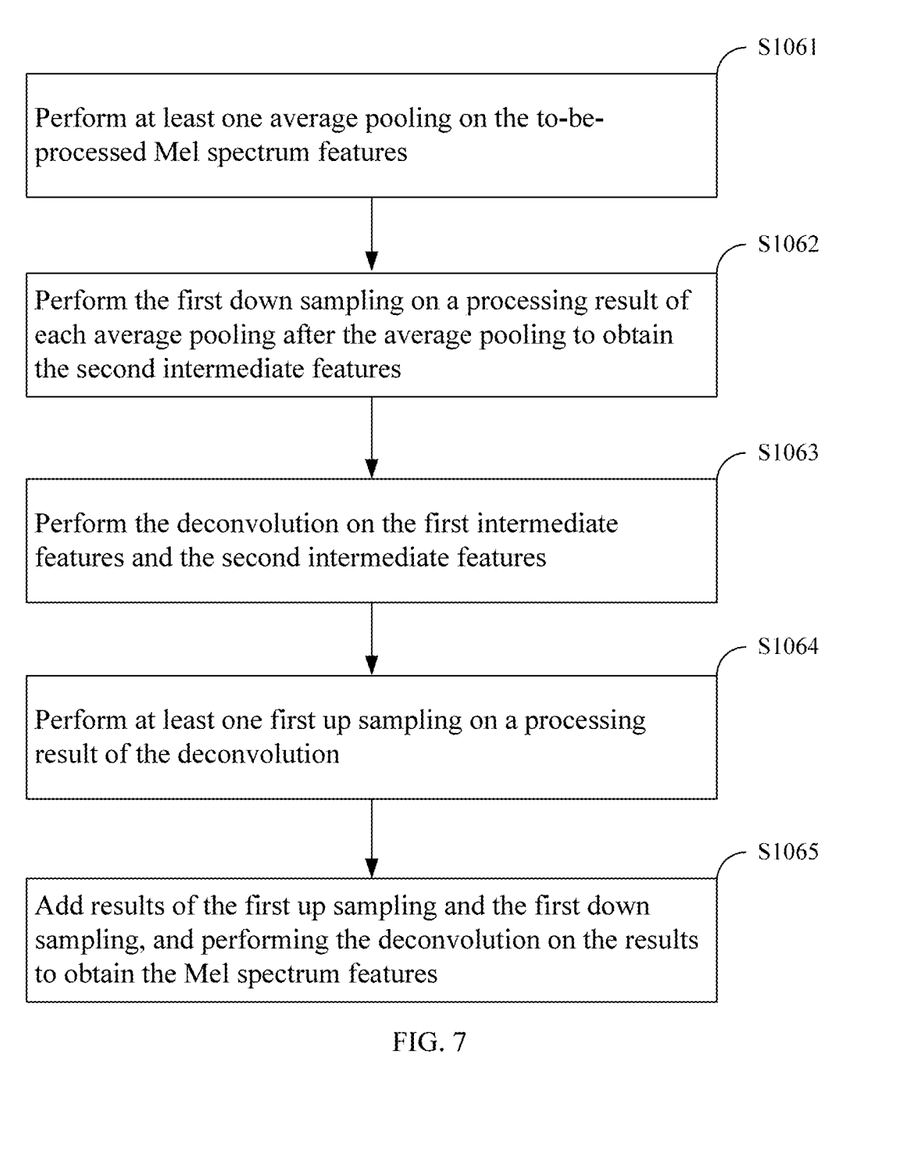
FIG. 7 is a flow chart of a post-processing according to the embodiment of FIG. 1.

FIG. 7 is a flow chart of a post-processing according to the embodiment of FIG. 1. As shown in FIG. 7, in this embodiment, the above-mentioned step S106 may be called a post-processing process, which includes steps of:

S1061: performing at least one average pooling on the to-be-processed Mel spectrum features;

S1062: performing the first down sampling on a processing result of each average pooling after the average pooling to obtain the second intermediate features;

S1063: performing the deconvolution on the first intermediate features and the second intermediate features;

S1064: performing at least one first up sampling on a processing result of the deconvolution; and S1065: adding results of the first up sampling and the first down sampling, and performing the deconvolution on the results to obtain the Mel spectrum features.

Figure 8:
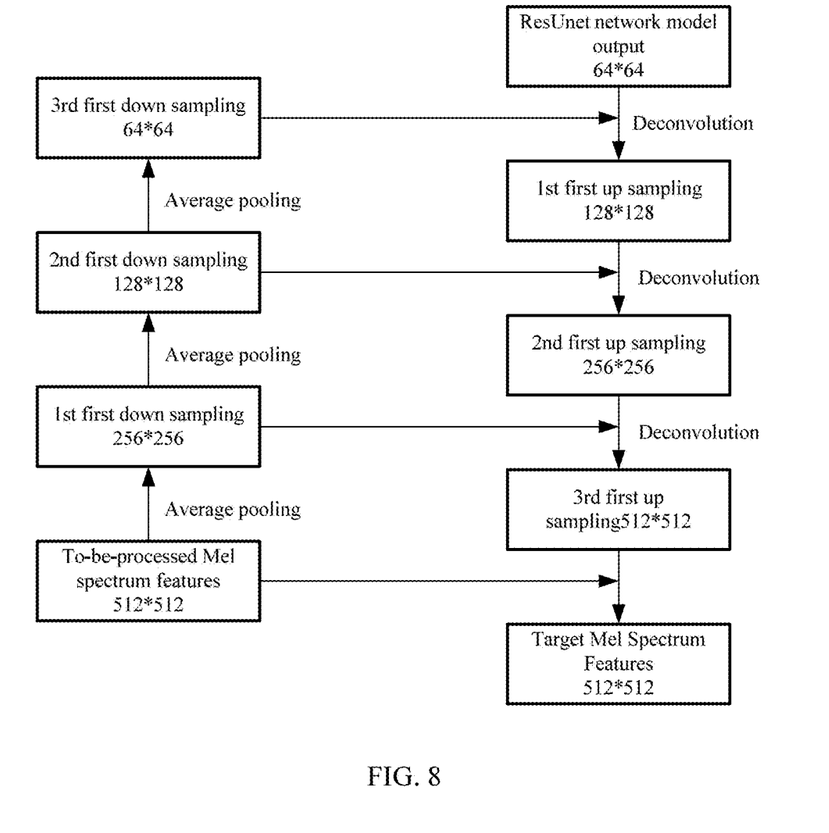
FIG. 8 is a flow chart of a post-processing according to another embodiment of the present disclosure.

FIG. 8 is a flow chart of a post-processing according to another embodiment of the present disclosure. Referring to FIG. 8, performing post-processing on Mel spectrum features is shown.

As an example, suppose the to-be-processed Mel spectrum features have a size of 512*512. As shown in FIG. 8, an average pooling (e.g., two-dimensional average pooling) is performed on the to-be-processed Mel spectrum features first, and then the 1st first down sampling is performed to obtain the Mel spectrum features having a size of 256*256; after performing the average pooling, the 2nd first down sampling is performed to obtain the Mel spectrum features having a size of 128*128; after performing the average pooling, the 3rd first down sampling is performed to obtain the Mel spectrum features having a size of 64*64, that is, the second intermediate features.

As shown in FIG. 8, the first intermediate features outputted by the ResUnet network model can also be the Mel spectrum feature having a size of 64*64. The first intermediate features and the second intermediate features are jump-added and to perform the 1st first up sampling (128*128 size) after the deconvolution (i.e., a two-dimensional deconvolution) is performed to obtain a first result. The first result is jump-added with the result after the 2nd first down sampling (256*256 size) to obtain a second result, and the second result is jump-added with the result after the 1st first down sampling, and then the deconvolution and the 3rd first up sampling (512*512 size) are performed to obtain a third result, then the third result is jump-added with the to-be-processed Mel spectrum features having a size of 512*512 size to obtain the final target Mel spectrum features, where the size of the target Mel spectrum features is 512*512.

Figure 9:
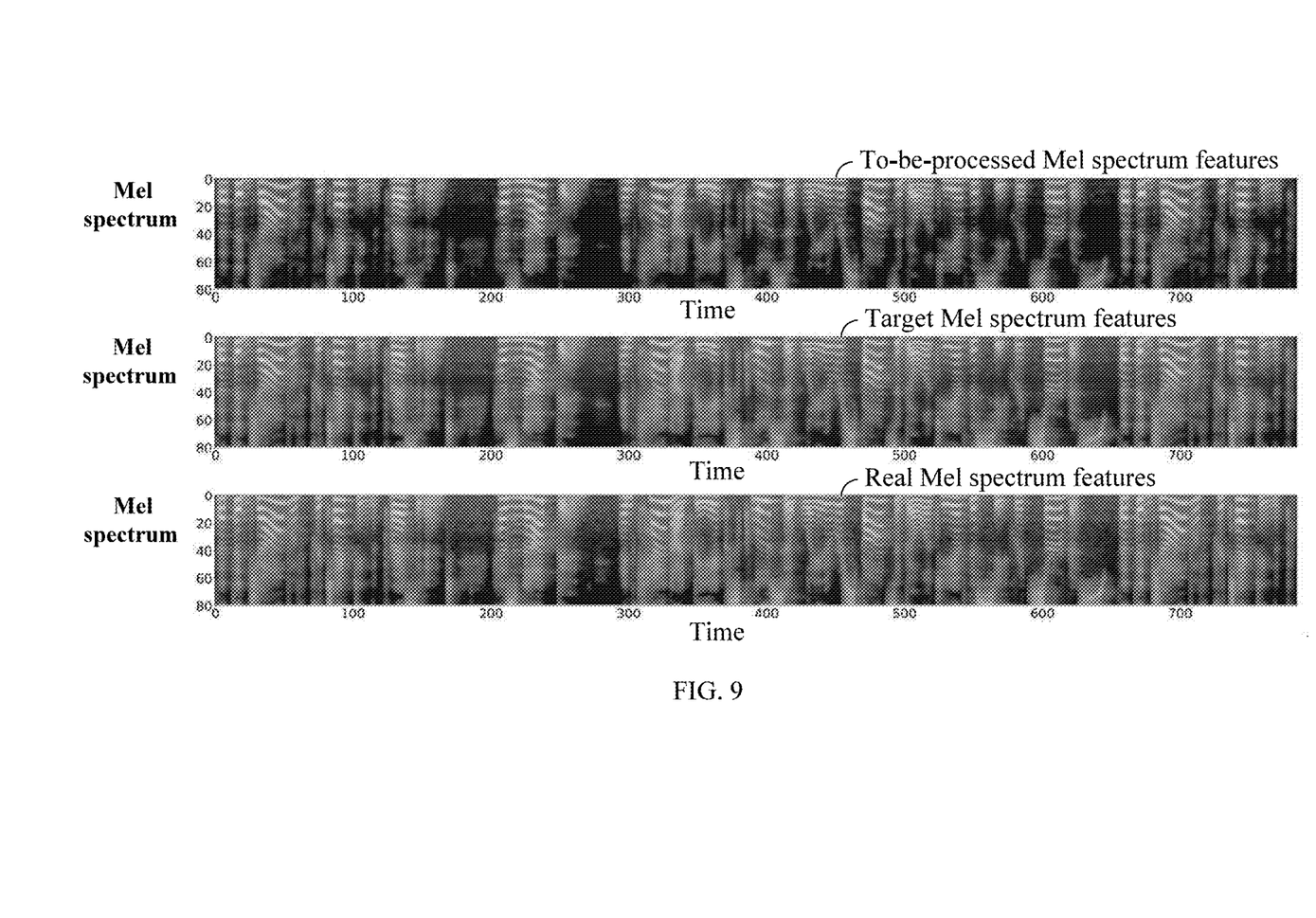
FIG. 9 is a schematic diagram of the Mel spectrum features after processed according to the embodiment of FIG. 1.

Through the average pooling and the first down sampling, the global semantic information contained in the features can be made more, and through jump-adding the results after the deconvolution, the first up sampling, and the first down sampling, the features can not only contain rich semantic information, but also contain enough spatial detail information, so that the prediction result can be more accurate when the features have high resolution. FIG. 9 is a schematic diagram of the Mel spectrum features after processed according to the embodiment of FIG. 1. Referring to FIG. 9, examples of the Mel spectrum features after processed by the above-mentioned method for processing to-be-processed Mel spectrum features are provided.

S108: converting the target Mel spectrum features into a target speech corresponding to the to-be-synthesized text.

In the step of speech synthesis, the target Mel spectrum features corresponding to the to-be-synthesized text are inputted into a preset acoustic encoder to output the corresponding target speech.

FIG. 10 is a schematic block diagram of a speech synthesis apparatus according to an embodiment of the present disclosure. In this embodiment, as shown in FIG. 10, a speech synthesis device is provided. The speech synthesis apparatus includes a processor and a storage. In which, the storage (e.g., a memory) store a computer program including modules which enables the processor to implement the above-mentioned speech synthesis method when executed by the processor. The modules includes:

a feature extraction module 202 configured to obtain a to-be-synthesized text, and extracting one or more to-be-processed Mel spectrum features of the to-be-synthesized text through a preset speech feature extraction algorithm;

a ResUnet module 204 configured to input the to-be-processed Mel spectrum features into a preset ResUnet network model to obtain one or more first intermediate features;

a post-processing module 206 configured to perform an average pooling and a first down sampling on the to-be-processed Mel spectrum features to obtain one or more second intermediate features, and configured to take the second intermediate features and the first intermediate features output by the ResUnet network model as an input to perform a deconvolution and a first up sampling so as to obtain one or more target Mel spectrum features corresponding to the to-be-processed Mel spectrum features; and a speech synthesis module 208 configured to convert the target Mel spectrum features into a target speech corresponding to the to-be-synthesized text.

In one embodiment, the ResUnet module 204 is configured to perform a second down sampling, a residual connection processing, and a second up sampling on the to-be-processed Mel spectrum features through the ResUnet network model to obtain the first intermediate features.

In one embodiment, the ResUnet network model includes at least one up sampling module, at least one residual connection module, and at least one down sampling module, and the ResUnet module 204 is further configured to:

perform the second down sampling on the to-be-processed Mel spectrum features through the down sampling module;

perform the second down sampling and the residual connection processing on an output of the down sampling module through the at least one residual connection module; and perform a second up sampling on an output of the residual connection module through the at least one up sampling module, and adding the output after performing the second up sampling and the output of the residual connection module to obtain the first intermediate features.

In one embodiment, the post-processing module 206 is configured to:

perform at least one average pooling on the to-be-processed Mel spectrum features; and perform the first down sampling on a processing result of each average pooling after the average pooling to obtain the second intermediate features.

In one embodiment, the post-processing module 206 is further configured to:

perform the deconvolution on the first intermediate features and the second intermediate features;

perform at least one first up sampling on a processing result of the deconvolution; and add results of the first up sampling and the first down sampling, and performing the deconvolution on the results to obtain the target Mel spectrum features.

FIG. 11 is a structural diagram of the internal of a computing device according to an embodiment. The computing device can be a terminal device or a server. As shown in FIG. 11, the computing device includes a processor, a storage, and a network interface which are connected through a system bus. In which, the storage includes a non-volatile storage medium and an internal memory. The non-volatile storage medium of the computing device stores an operating system, and may also store a computer program which enables the processor to implement the speech synthesis method for computing device sensors when executed by the processor. The internal memory may also store a computer program which enables the processor to perform the speech synthesis method for computing device sensors when executed by the processor. The network interface is used to communicate with the exterior. It can be understood by those skilled in the art that, the structure shown in FIG. 11 is only a block diagram of a part of the structure related to the scheme of the present disclosure, and does not constitute a limitation of the computing device to which the scheme of the present disclosure is applied. The specific computing device may include more or fewer components than shown in the figures, or some components can be combined, or can have different component arrangements.

In one embodiment, an intelligent terminal is provided, which includes a memory and a processor. The memory stores a computer program, and when the computer program is executed by the processor, the processor executes the following steps:

obtaining a to-be-synthesized text, and extracting one or more to-be-processed Mel spectrum features of the to-be-synthesized text through a preset speech feature extraction algorithm;

inputting the to-be-processed Mel spectrum features into a preset ResUnet network model to obtain one or more first intermediate features;

performing an average pooling and a first down sampling on the to-be-processed Mel spectrum features to obtain one or more second intermediate features;

taking the second intermediate features and the first intermediate features output by the ResUnet network model as an input to perform a deconvolution and a first up sampling so as to obtain one or more target Mel spectrum features corresponding to the to-be-processed Mel spectrum features; and converting the target Mel spectrum features into a target speech corresponding to the to-be-synthesized text.

In one embodiment, a non-transitory computer-readable storage medium is provided, which stores a computer program, and when the computer program is executed by a processor, the processor executes the following steps:

obtaining a to-be-synthesized text, and extracting one or more to-be-processed Mel spectrum features of the to-be-synthesized text through a preset speech feature extraction algorithm;

inputting the to-be-processed Mel spectrum features into a preset ResUnet network model to obtain one or more first intermediate features;

performing an average pooling and a first down sampling on the to-be-processed Mel spectrum features to obtain one or more second intermediate features;

taking the second intermediate features and the first intermediate features output by the ResUnet network model as an input to perform a deconvolution and a first up sampling so as to obtain one or more target Mel spectrum features corresponding to the to-be-processed Mel spectrum features; and converting the target Mel spectrum features into a target speech corresponding to the to-be-synthesized text.

After using the above-mentioned speech synthesis method, apparatus, intelligent terminal, and computer-readable storage medium, in the process of speech synthesis, the Mel spectrum features of the to-be-synthesized text are extracted first, then the down sampling, residual connection, and up sampling are performed on the extracted Mel spectrum features through the ResUnet network model to obtain the corresponding first intermediate features. Then, during the post-processing, the average pooling and down sampling are performed on the extracted Mel spectrum features, and the result is jump-added with the first intermediate features. And then multiple times of deconvolution and up sampling are performed, and the result is jump-added with the result after down sampling to obtain the final target Mel spectrum features, and speech synthesis is performed through the target Mel spectrum features.

That is to say, in this embodiment, the Mel spectrum features are processed through the ResUnet network model and post-processed so that the Mel spectrum features have both high-resolution features and global low-resolution features, which improves the accuracy of extracting Mel spectral features, thereby improving the accuracy of subsequent speech synthesis.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. It should be noted that, for those skilled in the art, a number of variations and improvements can still be made without departing from the spirit and scope of the present disclosure. Therefore, the scope of the present disclosure should be determined by the appended claims.

What is claimed is:

1. A computer-implemented speech synthesis method, comprising steps of:
   obtaining a to-be-synthesized text, and extracting one or more to-be-processed Mel spectrum features of the to-be-synthesized text through a preset speech feature extraction algorithm;
   inputting the to-be-processed Mel spectrum features into a preset ResUnet network model to obtain one or more first intermediate features;
   performing an average pooling and a first down sampling on the to-be-processed Mel spectrum features to obtain one or more second intermediate features;
   taking the second intermediate features and the first intermediate features output by the ResUnet network model as an input to perform a deconvolution and a first up sampling so as to obtain one or more target Mel spectrum features corresponding to the to-be-processed Mel spectrum features; and
   converting the target Mel spectrum features into a target speech corresponding to the to-be-synthesized text;
   wherein the step of inputting the to-be-processed Mel spectrum features into the preset ResUnet network model to obtain the first intermediate features comprises:
      performing a second down sampling, a residual connection processing, and a second up sampling on the to-be-processed Mel spectrum features through the ResUnet network model to obtain the first intermediate features; and
   wherein the ResUnet network model comprises at least one up sampling module, at least one residual connection module, and at least one down sampling module, and the step of inputting the to-be-processed Mel spectrum features into the preset ResUnet network model to obtain the first intermediate features further comprises:
      performing the second down sampling on the to-be-processed Mel spectrum features through the down sampling module;
      performing the second down sampling and the residual connection processing on an output of the down sampling module through the at least one residual connection module; and
      performing a second up sampling on an output of the residual connection module through the at least one up sampling module, and adding the output after performing the second up sampling and the output of the residual connection module to obtain the first intermediate features.

2. The method of claim 1, wherein the step of performing the average pooling and the first down sampling on the to-be-processed Mel spectrum features to obtain the second intermediate features comprises:
   performing at least one average pooling on the to-be-processed Mel spectrum features; and
   performing the first down sampling on a processing result of each average pooling after the average pooling to obtain the second intermediate features.

3. The method of claim 2, wherein the step of taking the second intermediate features and the first intermediate features output by the ResUnet network model as the input to perform the deconvolution and the first up sampling so as to obtain the target Mel spectrum features corresponding to the to-be-processed Mel spectrum features comprises:
   performing the deconvolution on the first intermediate features and the second intermediate features;

performing at least one first up sampling on a processing result of the deconvolution; and adding results of the first up sampling and the first down sampling, and performing the deconvolution on the results to obtain the Mel spectrum features.

4. A speech synthesis apparatus, comprising:
a memory;
a processor; and
one or more computer programs stored in the memory and executable on the processor, wherein the one or more computer programs comprise;
instructions for obtaining a to-be-synthesized text, and extracting one or more to-be-processed Mel spectrum features of the to-be-synthesized text through a preset speech feature extraction algorithm;
instructions for inputting the to-be-processed Mel spectrum features into a preset ResUnet network model to obtain one or more first intermediate features;
instructions for performing an average pooling and a first down sampling on the to-be-processed Mel spectrum features to obtain one or more second intermediate features, and configured to take the second intermediate features and the first intermediate features output by the ResUnet network model as an input to perform a deconvolution and a first up sampling so as to obtain one or more target Mel spectrum features corresponding to the to-be-processed Mel spectrum features; and
instructions for converting the target Mel spectrum features into a target speech corresponding to the to-be-synthesized text;
wherein the instructions for inputting the to-be-processed Mel spectrum features into the preset ResUnet network model to obtain the first intermediate features comprise:
instructions for performing a second down sampling, a residual connection processing, and a second up sampling on the to-be-processed Mel spectrum features through the ResUnet network model to obtain the first intermediate features; and
wherein the ResUnet network model comprises at least one up sampling module, at least one residual connection module, and at least one down sampling module, and the instructions for inputting the to-be-processed Mel spectrum features into the preset ResUnet network model to obtain the first intermediate features further comprise:
instructions for performing the second down sampling on the to-be-processed Mel spectrum features through the down sampling module;
instructions for performing the second down sampling and the residual connection processing on an output of the down sampling module through the at least one residual connection module; and
instructions for performing a second up sampling on an output of the residual connection module through the at least one un sampling module, and adding the output after performing the second up sampling and the output of the residual connection module to obtain the first intermediate features.

5. The apparatus of claim 4, wherein the instructions for performing the average pooling and the first down sampling on the to-be-processed Mel spectrum features to obtain the second intermediate features comprise:
instructions for performing at least one average pooling on the to-be-processed Mel spectrum features; and instructions for performing the first down sampling on a processing result of each average pooling after the average pooling to obtain the second intermediate features.

6. The apparatus of claim 5, wherein the instructions for taking the second intermediate features and the first intermediate features output by the ResUnet network model as the input to perform the deconvolution and the first up sampling so as to obtain the target Mel spectrum features corresponding to the to-be-processed Mel spectrum features comprise:
instructions for performing the deconvolution on the first intermediate features and the second intermediate features;
instructions for performing at least one first up sampling on a processing result of the deconvolution; and
instructions for adding results of the first up sampling and the first down sampling, and performing the deconvolution on the results to obtain the Mel spectrum features.

7. A non-transitory computer readable storage medium for storing one or more computer programs, wherein the one or more computer programs comprise:
instructions for obtaining a to-be-synthesized text, and extracting one or more to-be-processed Mel spectrum features of the to-be-synthesized text through a preset speech feature extraction algorithm;
instructions for inputting the to-be-processed Mel spectrum features into a preset ResUnet network model to obtain one or more first intermediate features;
instructions for performing an average pooling and a first down sampling on the to-be-processed Mel spectrum features to obtain one or more second intermediate features, and configured to take the second intermediate features and the first intermediate features output by the ResUnet network model as an input to perform a deconvolution and a first up sampling so as to obtain one or more target Mel spectrum features corresponding to the to-be-processed Mel spectrum features; and
instructions for converting the target Mel spectrum features into a target speech corresponding to the to-be-synthesized text;
wherein the instructions for inputting the to-be-processed Mel spectrum features into the preset ResUnet network model to obtain the first intermediate features comprise:
instructions for performing a second down sampling, a residual connection processing, and a second up sampling on the to-be-processed Mel spectrum features through the ResUnet network model to obtain the first intermediate features; and
wherein the ResUnet network model comprises at least one up sampling module, at least one residual connection module, and at least one down sampling module, and the instructions for inputting the to-be-processed Mel spectrum features into the preset ResUnet network model to obtain the first intermediate features further comprise:
instructions for performing the second down sampling on the to-be-processed Mel spectrum features through the down sampling module;
instructions for performing the second down sampling and the residual connection processing on an output of the down sampling module through the at least one residual connection module; and
instructions for performing a second up sampling on an output of the residual connection module through the at least one up sampling module, and adding the output after performing the second up sampling and the output of the residual connection module to obtain the first intermediate features.

8. The storage medium of claim 7, wherein the instructions for performing the average pooling and the first down sampling on the to-be-processed Mel spectrum features to obtain the second intermediate features comprise:
   instructions for performing at least one average pooling on the to-be-processed Mel spectrum features; and
   instructions for performing the first down sampling on a processing result of each average pooling after the average pooling to obtain the second intermediate features.

9. The storage medium of claim 8, wherein the instructions for taking the second intermediate features and the first intermediate features output by the ResUnet network model as the input to perform the deconvolution and the first up sampling so as to obtain the target Mel spectrum features corresponding to the to-be-processed Mel spectrum features comprise:
   instructions for performing the deconvolution on the first intermediate features and the second intermediate features;
   instructions for performing at least one first up sampling on a processing result of the deconvolution; and
   instructions for adding results of the first up sampling and the first down sampling, and performing the deconvolution on the results to obtain the Mel spectrum features.

10. The method of claim 1, wherein the down sampling module comprises two groups of structures, each of the two groups of structures comprises a two-dimensional convolutional layer, a two-dimensional batch normalization, and a rectified linear unit.

11. The method of claim 1, wherein the residual connection module comprises a down sampling module and one group of structure comprising a two-dimensional convolutional layer, a two-dimensional batch normalization, and a rectified linear unit; and
   wherein an input of the residual connection module is processed by the down sampling module and the one group structure of the residual connection module, a result is obtained, and a jump addition is performed on the obtained result.

12. The method of claim 1, wherein the up sampling module comprises a first branch and a second branch; and
   wherein the first branch does not process an input of the up sampling module, while in the second branch, the input of the up sampling module is processed by a residual connection module, a two-dimensional maximum pooling layer, a two-dimensional discarding layer, a two-dimensional deconvolution layer, a two-dimensional batch normalization, and a rectified linear unit, and then is jump-added with the first branch.

13. The method of claim 1, wherein a number of the residual connection module is same as a number of the up sampling module in the preset ResUnet network model.

14. The apparatus of claim 4, wherein the down sampling module comprises two groups of structures, each of the two groups of structures comprises a two-dimensional convolutional layer, a two-dimensional batch normalization, and a rectified linear unit.

15. The apparatus of claim 4, wherein the residual connection module comprises a down sampling module and one group of structure comprising a two-dimensional convolutional layer, a two-dimensional batch normalization, and a rectified linear unit; and
   wherein an input of the residual connection module is processed by the down sampling module and the one group structure of the residual connection module, a result is obtained, and a jump addition is performed on the obtained result.

16. The apparatus of claim 4, wherein the up sampling module comprises a first branch and a second branch, and;
   wherein the first branch does not process an input of the up sampling module, while in the second branch, the input of the up sampling module is processed by a residual connection module, a two-dimensional maximum pooling layer, a two-dimensional discarding layer, a two-dimensional deconvolution layer, a two-dimensional batch normalization, and a rectified linear unit, and then is jump-added with the first branch.

17. The apparatus of claim 4, wherein a number of the residual connection module is same as a number of the up sampling module in the preset ResUnet network model.

18. The storage medium of claim 7, wherein the down sampling module comprises two groups of structures, each of the two groups of structures comprises a two-dimensional convolutional layer, a two-dimensional batch normalization, and a rectified linear unit.

19. The storage medium of claim 7, wherein the residual connection module comprises a down sampling module and one group of structure comprising a two-dimensional convolutional layer, a two-dimensional batch normalization, and a rectified linear unit; and
   wherein an input of the residual connection module is processed by the down sampling module and the one group structure of the residual connection module, a result is obtained, and a jump addition is performed on the obtained result.

20. The storage medium of claim 7, wherein the up sampling module comprises a first branch and a second branch, and;
   wherein the first branch does not process an input of the up sampling module, while in the second branch, the input of the up sampling module is processed by a residual connection module, a two-dimensional maximum pooling layer, a two-dimensional discarding layer, a two-dimensional deconvolution layer, a two-dimensional batch normalization, and a rectified linear unit, and then is jump-added with the first branch.

* * * * *